(12) United States Patent
Bosen

(10) Patent No.: US 6,764,281 B2
(45) Date of Patent: Jul. 20, 2004

(54) ROTOR SYSTEM FOR AN EXPANSION TURBINE FOR LOW-TEMPERATURE APPLICATIONS

(75) Inventor: Werner Bosen, Köln (DE)

(73) Assignee: Atlas Copco Energas GmbH, Köln (DE)

( * ) Notice: Subject to any disclaimer, the term of this patent is extended or adjusted under 35 U.S.C. 154(b) by 75 days.

(21) Appl. No.: 10/285,333

(22) Filed: Oct. 31, 2002

(65) Prior Publication Data

US 2003/0108428 A1 Jun. 12, 2003

(30) Foreign Application Priority Data

Nov. 15, 2001  (DE) .......................................... 101 56 228

(51) Int. Cl.⁷ .............................................. F01D 5/30
(52) U.S. Cl. ............................. 416/204 R; 416/204 A; 416/249 R; 415/216.1
(58) Field of Search .................... 415/216.1; 416/204 R, 416/204 A, 244 A, 244 R, 245 R

(56) References Cited

U.S. PATENT DOCUMENTS 1,665,458 A * 4/1928 Hollander ................ 415/217.1
3,642,383 A * 2/1972 Andvig .................... 416/244 R
3,904,301 A * 9/1975 Schroeder ................ 416/244 A
4,815,931 A * 3/1989 Linck et al. ............. 416/244 A
6,508,619 B1 * 1/2003 Bosen ........................ 415/180

FOREIGN PATENT DOCUMENTS

DE          3005058 A1 *  8/1980  ............. F01D/5/04

* cited by examiner

Primary Examiner—Edward K. Look
Assistant Examiner—Igor Kershteyn
(74) Attorney, Agent, or Firm—Collard & Roe, P.C.

(57) ABSTRACT

A rotor of an expansion turbine for low-temperature applications that comprises a turbine rotor, wherein a cold gas is admitted and flows through the rotor centripetally. There is also a turbine shaft. There is also a stud screw that can be inserted in a threaded bore of the turbine shaft on the face side of the shaft that extends through the turbine rotor. There is also a rotor nut mounted on the protruding end of the stud screw. The turbine rotor is secured on the end of the turbine shaft in an overhung manner with the help of the rotor nut and the pre-tensioned stud screw. A rotor hub cap consisting of a heat-insulating material is mounted on the free end of the stud screw protruding into the cold gas flowing off, as well as on the rotor nut.

6 Claims, 1 Drawing Sheet

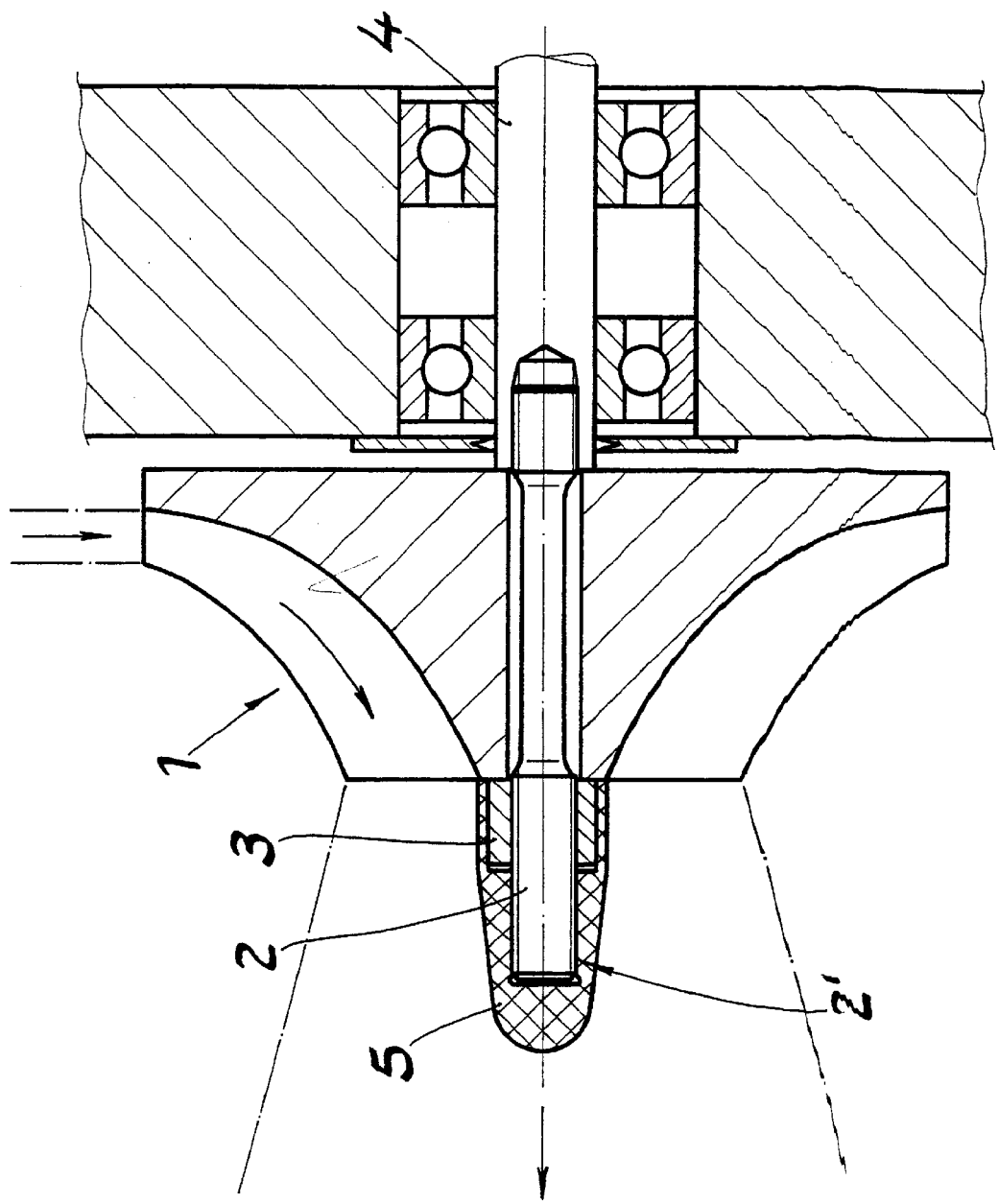

ROTOR SYSTEM FOR AN EXPANSION TURBINE FOR LOW-TEMPERATURE APPLICATIONS

CROSS-REFERENCE TO RELATED APPLICATIONS

Applicant claims priority under 35 U.S.C. §119 of German Application No. 101 56 228.4 filed Nov. 15, 2001.

The invention relates to a turbine rotor of an expansion turbine for low-temperature applications. With this turbine rotor, cold gas is admitted that flows centripetally through the turbine rotor, such as from the outside to inwards. The rotor is secured on a turbine shaft in an overhung manner.

In low-temperature applications, for example, in gas separation or treatment plants, extremely low expansion temperatures in the range of −80° C. to −200° C. may occur with the cold gas flowing off. The problem with such extremely low temperatures is that a strong dissipation of heat occurs from the cold gas flowing off of the hot turbine shaft via the fastening of the turbine rotor onto the shaft. In low-temperature applications, the stream of heat flowing off via the fastening of the turbine rotor has an extremely negative effect on the overall function of the expansion turbine. For example, the gas cooling off in the course of the expansion process is reheated, which directly counteracts an ideal, i.e., isentropic cold expansion, and consequently reduces the degree of efficiency of the turbine. The shaft of the turbine is cooled to a very low degree at the same time, which has a negative effect on the lubrication in the bearings of the shaft of the turbine. This negative effect occurs especially when anti-friction bearings, lubricated with a minimum amount of oil or with grease are used. These bearings produce only a low loss of heat due to friction even at high rotary speeds of the turbine. Thus, the risk posed is that the lubricants may break down and the bearings of the turbine shaft will spontaneously fail due to lack of lubrication.

The invention is designed to effectively reduce the dissipation of heat in an expansion turbine for low-temperature applications. The dissipation of heat emanates from the turbine shaft into the cold gas flowing off. Thus, the invention relates to a design which maintains the highest possible degree of efficiency of the turbine, while allowing an adequate supply of lubricant with the anti-friction bearing being lubricated with a minimal amount of oil or with grease.

SUMMARY OF THE INVENTION

One object of the invention is to provide a rotor system for an expansion turbine for low-temperature applications which comprises a turbine rotor coupled to a turbine shaft, wherein cold gas is admitted and is flowing centripetally through the rotor.

A stud screw is inserted in a threaded bore of the turbine shaft on the face side of the shaft and extends through the rotor of the turbine. In addition, a rotor nut is mounted on the protruding end of the pin screw.

With this design, the rotor of the turbine is secured in an overhung manner on the end of the turbine shaft with the help of the rotor nut and the pre-tensioned stud screw. A rotor hub cap made of a heat-insulating material is mounted on the free end of the stud screw protruding into the cold gas flowing off, as well as on the rotor nut. The threaded ends of the pin stud screw and the rotor nut protrude far into the cold gas flowing off. Because of the high pressure that acts on the surfaces on the flanks of the thread of the stud screw, the rotor nut, and on the turbine shaft, there can be a high transfer of heat between these structural components. To prevent any interfering dissipation of heat, a rotor hub cap is mounted on these components. The material of the cap has a low thermal conductivity. The preferred materials have a thermal conductivity from 0.19 to 0.30 W/(mK), in particular heavy-duty plastics, for example polyamidimides, or fiber-reinforced composite materials consisting, of a modified polyimide resin and a fabric inlay.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

In the drawing, wherein similar reference characters denote similar elements throughout the several views:

The FIGURE schematically shows a longitudinal section through the rotor of an expansion turbine for low-temperature applications with flow-off temperatures between −80° C. and −200° C.

DETAILED DESCRIPTION

Referring to the drawing, the FIGURE shows the basic structure of the rotor which comprises a turbine rotor 1 that is arranged in an overhung manner, a stud screw 2, a rotor nut 3, and a turbine shaft 4. Stud screw 2 is inserted in a threaded bore of turbine shaft 4 on the face side of the shaft and extends through turbine rotor 1. With the help of rotor nut 3 and pre-tensioned stud screw 2, turbine rotor 1 is secured on the end of turbine shaft 4. There are thermal bridges at the end 2' of the thread of stud screw 2 projecting into the off-flow, the thread contact surfaces between stud screw 2 and the rotor nut 3, as well as between stud screw 2 and turbine shaft 4. These thermal bridges allow a stream of heat to flow from hot turbine shaft 4 into the cold gas flowing off. To insulate and reduce this flow of heat, a rotor hub cap 5 made of a heat-insulating material is mounted on free end 2' of stud screw 2 protruding into the cold gas flowing off, as well as on rotor nut 3.

In the present embodiment, rotor hub cap 5 consists of a heavy-duty plastic, for example a polyamidimide, which is commercially available under the trade name Torlon®. In addition, other materials can be fiber-reinforced plastics consisting, of a modified polyimide resin and a glass fabric. This material is known under the trade name "Frathernit AP".

Accordingly, while one embodiment of the present invention has been shown and described, it is to be understood that many changes and modifications may be made thereunto without departing from the spirit and scope of the invention as defined in the appended claims.

What is claimed is:

1. A rotor system for an expansion turbine for low-temperature applications comprising:
   a) a turbine rotor which allows cold gas to be centripetally flowed through;
   b) a turbine shaft having a threaded bore;
   c) a pre-tensioned stud screw inserted into said threaded bore on a face side of said turbine shaft and extending through said turbine rotor;

d) a rotor nut secured on a protruding end of said pre-tensioned stud screw; and e) a turbine hub cap made from a heat insulating material and mounted on a free end of said pre-tensioned stud screw;

wherein said turbine rotor is secured in an overhung manner on an end of said turbine shaft via said rotor nut and said pre-tensioned stud screw and wherein said turbine hub cap projects into said cold gas flowing off and also projecting onto said rotor nut.

2. The rotor as in claim 1, wherein said rotor hub cap is made from material having a conductivity of 0.19 to 0.30 (W/mK).

3. The rotor as in claim 1, wherein said rotor hub cap is made from plastic.

4. The rotor as in claim 3, wherein said rotor hub cap comprises polyamidimide.

5. The rotor as in claim 1, wherein said rotor hub cap comprises a fiber reinforced plastic.

6. The rotor as in claim 5, wherein said fiber reinforced plastic comprises a modified polyimide resin and glass fabric.

* * * * *